United States Patent
Thomas

(10) Patent No.: US 7,207,540 B2
(45) Date of Patent: Apr. 24, 2007

(54) PORTABLE SUPPORT FOR LAPTOP COMPUTER

(76) Inventor: George R. Thomas, 55 Meridene Cr., London, Ontario (CA) N5X 2M1

(*) Notice: Subject to any disclaimer, the term of this patent is extended or adjusted under 35 U.S.C. 154(b) by 80 days.

(21) Appl. No.: 11/109,856

(22) Filed: Apr. 20, 2005

(65) Prior Publication Data

US 2006/0237615 A1 Oct. 26, 2006

(51) Int. Cl.
*A47B 95/00* (2006.01)
*A47G 29/00* (2006.01)
*B65D 19/00* (2006.01)

(52) U.S. Cl. .......................... 248/346.01; 248/346.03; 248/917; 248/918; 248/919; 108/180; 211/72

(58) Field of Classification Search ........ 248/917–919, 248/346.01, 346.03, 445–447, 449, 452–456, 248/460; 108/180, 1; 312/231, 233; 211/42, 211/72, 169
See application file for complete search history.

(56) References Cited

U.S. PATENT DOCUMENTS

| | | | |
|---|---|---|---|
| 905,836 A * | 12/1908 | Bowman | 312/233 |
| D164,483 S * | 9/1951 | Flannery | D19/91 |
| 2,792,668 A * | 5/1957 | Gallamos | 248/456 |
| D244,331 S * | 5/1977 | Woods | D18/12 |
| 4,240,761 A * | 12/1980 | Jacobson | 402/76 |
| 4,318,471 A * | 3/1982 | Hutton | 206/214 |
| 4,618,119 A * | 10/1986 | Powell | 248/456 |
| 4,623,276 A * | 11/1986 | Kinneir | 402/80 R |
| 4,624,433 A * | 11/1986 | Henneberg | 248/346.06 |
| 4,650,111 A * | 3/1987 | Jahoda | 229/103 |
| 4,765,462 A * | 8/1988 | Rose, Jr. | 206/760 |
| 5,054,736 A * | 10/1991 | Champoux | 248/444 |
| 5,100,098 A | 3/1992 | Hawkins | |
| D328,985 S * | 9/1992 | Sheldon | D6/406.4 |
| 5,143,341 A | 9/1992 | Juster | |
| 5,337,985 A * | 8/1994 | Hale | 248/174 |
| 5,451,025 A * | 9/1995 | Hames | 248/456 |
| 5,607,135 A * | 3/1997 | Yamada | 248/456 |
| 5,636,095 A * | 6/1997 | McGrath et al. | 360/133 |
| 5,927,676 A * | 7/1999 | Lefton | 248/472 |
| 6,021,720 A * | 2/2000 | Boos et al. | 108/44 |

(Continued)

*Primary Examiner*—Anita King
*Assistant Examiner*—Michael McDuffie
(74) *Attorney, Agent, or Firm*—Standley Law Group LLP

(57) ABSTRACT

A support for supporting a laptop computer has a top tray in cooperation with but not attached to a bottom tray. The top tray is moveable from an inclined working position to a flat storage position. The top tray has a top base having a lip proximal one end. The bottom tray has a bottom base having a flange extending upwardly proximal one end. The flange and/or the bottom base of the bottom tray has an aperture for accepting the lip of the top tray. The lip of the top tray may engage the top of the flange when the top tray is in the working position to prevent the top tray from sliding towards the opposite end of the bottom tray. The lip of the top tray engages the bottom base through the aperture when the top tray is in the storage position to limit sliding of the top tray toward the opposite end of the bottom tray. In the storage position, the support is readily packed together with the computer in the computer's carrying case. In the working position, the support provides good protection from heat generated by the computer, provides cooling for the computer, improves a user's sitting posture and reduces eye strain.

23 Claims, 11 Drawing Sheets

U.S. PATENT DOCUMENTS

| | | | |
|---|---|---|---|
| 6,098,952 A * | 8/2000 | Tonn | 248/688 |
| 6,213,439 B1 * | 4/2001 | Giulie et al. | 248/459 |
| 6,234,085 B1 | 6/2001 | Ramundo | |
| 6,305,652 B1 * | 10/2001 | Borke et al. | 248/174 |
| 6,374,751 B1 * | 4/2002 | With | 108/43 |
| 6,435,466 B1 * | 8/2002 | Adams | 248/455 |
| 6,557,811 B1 * | 5/2003 | Burns | 248/460 |
| 6,568,650 B2 * | 5/2003 | Helmetsie et al. | 248/678 |
| 6,604,472 B2 * | 8/2003 | McNeil | 108/42 |
| 6,672,557 B1 | 1/2004 | Jackson | |
| 6,772,986 B1 * | 8/2004 | Bennett | 248/441.1 |
| 2001/0003961 A1 * | 6/2001 | Hodge et al. | 108/97 |
| 2002/0003197 A1 | 1/2002 | MacEachern | |
| 2004/0007649 A1 * | 1/2004 | Vettraino | 248/127 |
| 2004/0048077 A1 * | 3/2004 | Gabower | 428/457 |

\* cited by examiner

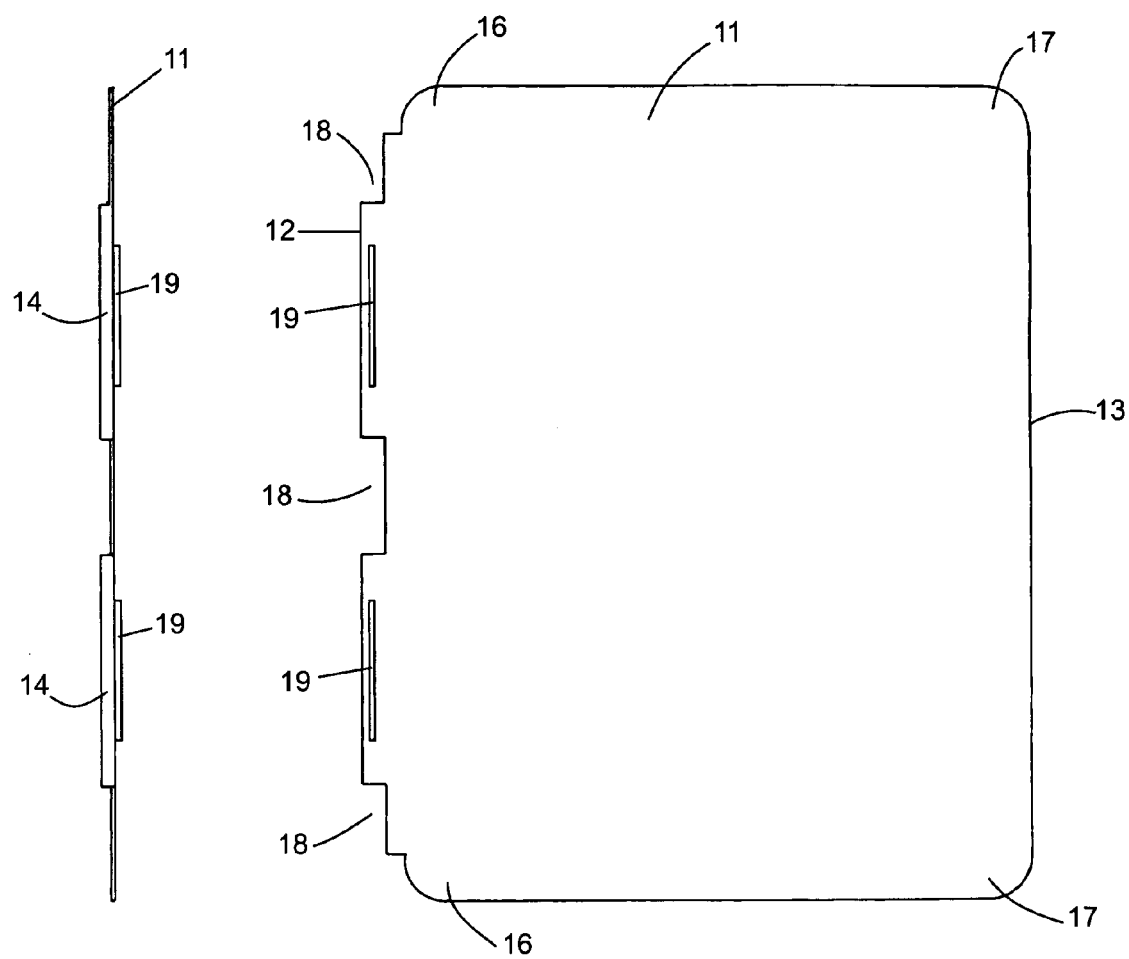
FIG. 7B
FIG. 7A
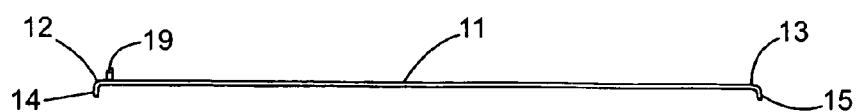
FIG. 7C

PORTABLE SUPPORT FOR LAPTOP COMPUTER

FIELD OF THE INVENTION

The present invention is directed to a portable support and radiation shield for a laptop computer.

BACKGROUND OF THE INVENTION

Portable laptop computers permit people to do work out of the normal office environment. Laptop computers are typically stored and transported in a carrying case. Although some places have tables, desks and the like to set the computer on when working, in many places, such as airports, a ready working surface is not easily found. Therefore, many people use their laps to support the laptop computer while working from a seated position. In balancing the laptop computer with its keyboard on the lap, a person tends to keep the thighs closed and the shoulders stooped forward. The former results in an elevation of temperature in the scrotal area, contributing to lower sperm count in men, and the latter in a stiff thoracic spine contributing to back ache. Further, radiation (e.g. heat and electric and magnetic fields) generated by laptop computers can be uncomfortable and hazardous to health.

It would be beneficial to have a support device for supporting a laptop computer on a person's lap. Such a device ideally fits within the carrying case with the computer, is light and robust, is easy to set up and take down, is comfortable to use, helps to improve the sitting posture and protects the person from radiation generated by the computer. Prior art supports fall short on one or more of these requirements.

The use of wedge-shaped supporting devices is common in the art. However, prior art support devices of this nature either cannot be adjusted to lose the wedge-shape or rely on some kind of hinge system to collapse down. In the former, the support cannot be stored along with the computer in the computer's carrying case. In the latter, the hinge system is complicated to use or is prone to breaking thereby detracting from the convenience or utility of the support.

U.S. Pat. No. 6,305,652 issued Oct. 23, 2001 is a representative example of the prior art. U.S. Pat. No. 6,305,652 discloses a laptop computer support comprising three or more hinged panels. While presenting some desirable features, the support disclosed in this patent requires "living hinges" to connect the three panels. Such an arrangement requires that either one of the support panels be smaller than the other thereby providing less working supporting surface, or the presence of a fourth hinged panel which results in a thicker profile making it more difficult to store the support in the laptop carrying case. In addition, the "living hinges" limit the construction material to plastic, therefore embodiments that also protect against radiation cannot be made easily. In addition, "living hinges" are prone to breaking with time and use, which would destroy the usefulness of the support.

There remains a need in the art for a portable laptop computer support that is convenient, simple and comfortable to use, is robust and portable and fits within the carrying case of the laptop computer, and protects a person from the harmful effects of radiation generated by the computer.

SUMMARY OF THE INVENTION

There is provided a support for supporting a laptop computer comprising a top tray in cooperation with but not attached to a bottom tray, the top tray moveable from an inclined working position to a flat storage position, the top tray comprising a top base having a first end and a second end opposite the first end, and having a first lip proximal the first end, the bottom tray comprising a bottom base having a first end and a second end opposite the first end, and having a flange extending upwardly proximal the first end, the flange and/or the bottom base having an aperture for accepting the first lip of the top tray, the first lip of the top tray engaging the bottom base through the aperture when the top tray is in the storage position to limit sliding of the top tray toward the second end of the bottom base when the top tray is in the storage position, and the support comprising means for preventing the top tray from sliding towards the second end of the bottom base when the top tray is in the working position.

The top and bottom trays of the support are designed to cooperate to provide an inclined working position in which the support can rest on the lap of a sitting or reclining person. This provides a level surface on which to set a laptop computer while protecting the person from the heat generated by the computer. The trays are also designed to cooperate to provide a flat storage position in which the laptop computer together with the support can be conveniently inserted into the laptop computer's carrying case. Switching from the working position to the storage position and vice versa may be easily accomplished by completely separating the top tray from the bottom tray and moving the top tray from one position to the other while the laptop computer remains on the top tray. The top tray and the bottom tray are separate pieces that cooperate together but are not attached to each other by hinges, flexible material or the like.

The top and bottom trays may further comprise a variety of features that cooperate to enhance the convenience, safety and versatility of the support.

In the storage position, the first lip of the top tray may engage the bottom base through the aperture to limit sliding of the top tray toward the second end of the bottom base. In the working position, the first lip may be the means for preventing the top tray from sliding towards the second end of the bottom base by engaging a top of the flange to prevent the top tray from sliding towards the second end of the bottom base. Preferably, the first lip is at the first end of the top base.

Preferably, the first lip of the top tray may be divided into two or more spaced-apart lips. This provides the capability to have more than one aperture in the flange of the bottom tray. Regions on the flange between the apertures act to reinforce the structural integrity of the flange. In this way, a greater surface area of the flange can be devoted to apertures in order to reduce the weight of the support while maintaining its supporting capacity. More surface area devoted to apertures also reduces conduction of heat from the top tray to the bottom tray through the flange and provides for greater air convection between the top and bottom bases to provide better cooling. Having two or more spaced-apart first lips also provides the opportunity for the first lips to straddle one or more of the reinforcing regions of the flange in the storage position. Such straddling serves to reduce the possibility of the top tray sliding off side edges of the bottom tray in the storage position. To this end, it is preferable that spacing between the first lips is small enough that a corner of the first end of the top base does not slide out through an aperture in the flange.

The first lip preferably has a depth no greater than the thickness of the bottom base in order to provide a flatter profile in the storage position. A flatter profile reduces the chance that the support will damage the carrying case when the computer and support are inserted into the case. Preferably, the first lip is exactly as deep as the thickness of the bottom base to maximize engagement between the first lip and the top of the flange in the working position.

The top base at the first end may further comprise a notch between and to the sides of the spaced-apart first lips. When a notch is present, the notch is preferably just large enough to always provide an air gap between the first end of the top base and the top of the flange in the working position. This reduces contact between the top tray and bottom tray thereby reducing conduction of heat from the top tray to the bottom tray and also provides for better air circulation between the top and bottom bases. The notch may be the same or different in size between the first lips as it is to the sides of the first lips. Preferably, the notch is larger between the first lips than to the sides of the lips.

The corners of the first end of the top base may each comprise cut-outs. Such cut-outs accommodate raised portions at the corners of the first end of the bottom base. The function of the raised corners is explained in greater below. The cut-outs should not be too large so that the first end of the top base cannot slip out through the aperture in the flange in the storage position.

The top base comprises a second lip proximal the second end. In the storage position, the second lip can engage the second end of the bottom base to prevent the top tray from sliding toward the first end. In the working position, the second lip raises the top base off the bottom base. This ensures minimal physical contact between the top tray and the bottom tray near the second end and provides for better air convection between the bases of the trays.

Preferably, the second lip of the top tray is no deeper than the thickness of the bottom base in order to provide a flatter profile in the storage position. A flatter profile reduces the chance that the support will damage the carrying case when the computer and support are inserted into the case. Preferably, the second lip is exactly as deep as the thickness of the bottom base to maximize separation of the top and bottom bases while maintaining the flatter profile. Preferably, the second lip is at the second end of the top base.

Extending upwardly from the bottom base is a flange. The flange preferably extends upwardly from the first end of the bottom base. Preferably, the flange has a height that permits sufficient separation between the top and bottom bases in the working position so that heat radiation from the top tray does not significantly heat the bottom tray. Preferably, the height of the flange is large enough to afford greater inclination for the top base in the working position when the support is used in a reverse orientation on the lap of a reclining person. Preferably, the height of the flange is small enough that the flange does not stick out over the top of a closed laptop computer when the support is in the storage position. More preferably, the height of the flange is the maximum height that it can be without sticking out over the top of the back of the closed laptop computer in the storage position. For example, the height of the flange may be in a range of from about 2.0 cm to about 4.5 cm, preferably from about 3.0 cm to about 4.1 cm, more preferably from about 3.5 cm to about 3.9 cm. For example, the height may be about 3.8 cm.

The flange preferably has one or more apertures for accepting the first lip of the top tray in the storage position. In the storage position, the aperture permits the first lip of the top tray to engage the first end of the bottom base to prevent the top tray from sliding to the second end of the bottom base. In the storage position, the top tray is prevented from slipping sideways off the bottom tray by virtue of the first lip being within the aperture. Spaced-apart first lips may be accommodated in a single aperture or by having more than one aperture. Regions of the flange between the apertures act to reinforce the flange.

Apertures in the flange preferably extend up from the bottom base so that there is no ridge where the apertures meet the bottom base. In this way the top base is able to lie flat on the bottom base in the storage position. Where or proximal where the apertures meet the bottom base, the bottom base may also have a notched out portion or channel to accommodate the thickness of the first lip in the storage position. The notched out portion or channel preferably has a uniform depth. With a notched out portion, the first lip and the flange are flush when viewed from the side in the storage position. In the case of either a notched out portion or a channel, the bottom base and the first lip are flush when viewed from the side, if the first lip has a depth equal to the thickness of the bottom base. Such arrangements reduce the overall size of the support in the storage position so the support fits better in the carrying case reducing the risk of damaging the carrying case on exposed edges. Since, as described below, the top tray is preferably less deep than the bottom tray, the notched out portion or channel permits the second lip of the top base to engage the second end of the bottom base in the storage position to prevent the top tray from sliding towards the first end in the storage position. The notched out portion or the channel is preferably not too large in order to minimize sliding of the top tray between the first and second ends of the bottom base.

The first lip of the top tray may engage the top edge of the flange in the working position. To prevent the top tray from slipping sideways off the bottom tray in the working position, the top edge of the flange may comprise a notch or notches within which the top tray sits. The notch may extend along almost the entire length of the flange from one side of the bottom tray to the other. The ends of the notch prevent the top tray from slipping sideways off the bottom tray. Preferably, the notch minimizes the amount of sideways motion that the top tray can make. The notch on the flange is preferably as deep or deeper than the thickness of the top base. Preferably, the notch is somewhat deeper than the thickness of the top base so that the ends of the notch can also help prevent the computer from sliding off the first end of the top base in the working position when the support is used in a reverse orientation by a reclining person. Preferably, the notch has a depth of from about 1 mm to about 7 mm, more preferably from about 2 mm to about 6 mm.

The bottom tray may comprise raised portions at the corners of the first end of the bottom base. When the bottom tray is made of a single piece of material, the raised portions accommodate a rounding or curving of the corners where the flange meets the bottom base. The raised portions should be no thicker than the thickness of the top base. This keeps the computer sitting flat in the storage position. The corners of the top base proximal the first end have cut-outs providing ample clearance for the raised portions so that the top base sits flat on the bottom base, with no spacing between the bases in the storage position.

A ridge may exist on the upside of the top base parallel to the first lips proximal the first end. The ridge is preferably located at a position on the top base that would be coplanar with the flange of the bottom tray in the storage position. The ridge serves to raise the laptop computer up off the top base in circumstances where the laptop computer is so large the laptop computer's feet do not sit on the top base. This is to ensure some ventilation between the computer and the top base. The ridge preferably has a height such that the top of the ridge is flush with the ends of the notch of the flange in the working position. The height is preferably slightly higher than the height of the feet of the computer. In addition, the ridge allows a part of the weight of such a computer to be distributed over a length of the ridge. The ridge has a thickness that is preferably uniform. Preferably, the thickness is in a range of from about 1 mm to about 4 mm, more preferably about 3 mm. The ridge preferably has a flat top but may be slanted at the top so that the slant is the same as the slant of the top base in the working position. The ridge may have rounded ends. The ridge also helps prevent the computer from sliding backward or forward off the top base. Preferably, there are two ridges, each ridge associated with one of the first lips. The two lips are preferably located centrally with respect to the lips with which each is associated.

In an alternate embodiment, the ridge may be provided as one or more protuberances extending upwardly from the top edge of the flange. The protuberances may be inserted through a slit or slits in the top base proximal the first end. In this embodiment, the notch or notches on the top edge of the flange are unnecessary since the top base would be prevented from sliding sideways by virtue of the protuberances in the slits. Also, the first lip does not necessarily need to engage the top of the flange as the protuberances in the slits also prevent the top tray from sliding towards the second end of the bottom base. Thus, in this embodiment the means for preventing the top tray from sliding towards the second end of the bottom base when the top tray is in the working position could comprise the protuberances in the slits. This embodiment requires alignment of the slits with the protuberances when converting from the storage position to the working position; therefore, the amount of time required to set up the support would be greater.

Side edges of the bottom base may comprise finger gaps for helping a person lift the top tray off the bottom tray from the storage position to the working position. The finger gaps are preferably semicircular. The finger gaps are preferably located about halfway along the side edges.

Preferably, the edges of top and bottom trays are rounded and smoothed where possible to reduce the likelihood of damaging the computer carrying case or other things or causing injury or discomfort to people. The bases may comprise slots or holes for reducing the weight of the support. Preferably the top and bottom bases do not comprise slots or holes that compromise the integrity of the radiation shielding.

The top and bottom trays may be made of any suitably rigid material. The top tray may be made of the same or different material as the bottom tray. Different areas of each tray may be made of different materials. Preferably, the trays comprise a material having good thermal conductivity, for example metals, metal composites and metals layered on a non-metallic substrate. Thermal conductivity is preferably greater than 1.0 watt cm$^{-1}$ K$^{-1}$ at 273 K, more preferably greater than 1.3 watt cm$^{-1}$ K$^{-1}$ at 273 K. The material preferably comprises aluminum (e.g. anodized aluminum) or magnesium alloy. Anodized aluminum is clean and hard and cheaper while magnesium alloys are lighter.

The top and bottom trays preferably have a relatively small thickness compared to their other two dimensions, i.e. width and depth. The depth is the distance from the first end to the second end. The width is the distance from one side edge to the other side edge. Preferably, the top and bottom trays independently have a thickness in a range of from about 1 mm to about 2 mm, more preferably about 1 mm. Preferably, the top and bottom trays have the same thickness. Thickness of the trays may be limited by the size of the laptop carrying case. Preferably, the top and bottom trays have the same width, but the top tray has a depth slightly less than the bottom tray. The width and depth of the trays may be limited by the size of the laptop carrying case. The width may also be limited by the spread between the thighs of a person in the sitting position. The width of at least the bottom tray is preferably wide enough to rest comfortably on the person's lap. The width and depth are also preferably large enough to accommodate the size of most laptop computers. The width is preferably from about 30 cm to about 35 cm, more preferably about 31.8 cm. The depth is preferably from about 25 cm to about 30 cm, more preferably about 26.0 cm. The depth of the top tray is preferably about 1–3 mm shorter than the bottom tray, more preferably about 1.5 mm shorter. Making the depth of the top tray less than the that of the bottom tray helps ensure that the second lip of the top base rests on the bottom base at the second end.

The support of the present invention is simple, versatile and effective, providing a number of advantages.

The support shields a person from heat generated by the computer. The design of the support reduces contact between the top tray where the computer sits and the bottom tray resting on the person's lap, thereby reducing the amount of heat conduction from the top tray to the bottom tray. Increased separation of the top base from the bottom base by virtue of the flange and the second lip reduces radiative heat transfer from the top tray to the bottom tray. Apertures in the flange permit better air convection between the bases thereby cooling the trays more effectively. Apertures in the flange also reduce the weight of the support.

The support provides effective cooling of the computer itself, particularly when the support is made of metal. A metal top tray helps conduct heat away from the computer. The heat absorbed by the top tray is then dissipated by radiation from the underside of the top tray and air convection in the gap between the top and bottom bases. Placing all commercially available laptop computers, each for two hours each on the support in the working position, it was found that the increase in temperature on the underside of the bottom base was less than 0.5° C.

The support allows a person to keep his/her thighs apart in the sitting position when the computer is used on the person's lap, rather than having them close together to balance the computer. Having thighs apart is more comfortable as it eases muscle strain, particularly in the shoulders, and keeps the scrotum cool. Furthermore, the inclined surface reduces shoulder and eye strain and improves sitting posture as the person does not need to bend forward.

The support is very portable. It can be converted from the working position to the storage position without removing the computer from the support and then the computer together with the support inserted into the laptop computer's carrying case. The support has a thin profile and readily fits in the carrying case together with the computer. The support can be used with all currently commercially available laptop computers.

The support is not heavy, and can be made even lighter with the use of light materials. Using aluminum or magnesium alloy, the weight may be in a range of from about 375 grams to about 525 grams. Further, the support acts as an armor shield physically protecting the computer from damage when stored with the computer in the computer case. Furthermore, instead of inserting the support together with the computer into a carrying case, the support in the storage position may be strapped to the laptop computer by means of a simple strap and inserted into any carrying receptacle, for example a backpack.

The support is very simple to use and easily converts between the working and storage positions. Set up after taking it out of the carrying case can be effected in as little as one second.

The support is very robust. The various parts of the support are not prone to breaking. Furthermore, the separate construction of the top and bottom trays adds tremendously to the expected life span of the support since there are no moving parts such as hinges that are prone to breaking.

The support may also be magnetically shielded to shield a person from the harmful effects of magnetic fields generated by the computer. Magnetic shielding preferably takes the form of a high permeability film, foil or sheet that may be adhered to the base of one or both of the trays. Preferably, the film or sheet is adhered to the underside of the top base and/or the upside of the bottom base. More preferably, both the underside of the top base and the upside of the bottom base have magnetic shielding adhered thereto. Even more preferably, the magnetic shielding adhered to the top base has a lesser permeability than the magnetic shielding adhered to the bottom base.

The magnetic shielding may cover the entire surface area or part of the surface area of the base to which it is adhered. Preferably, the magnetic shielding covers as large an area as possible without interfering with the function of the support. For example, the magnetic shielding may cover an area in a range of about 24–28 cm×22–25 cm, more preferably an area of about 26.3 cm×24.5 cm. Preferably, the longer side of the magnetic shielding is parallel to the longer side of the base. Preferably, edges of the magnetic shielding are from about 0.5 cm to about 1.5 cm, more preferably about 1 cm, away from the ends and sides of the bases. The magnetic shielding may be inset into a depression in the base. Preferably the surface of the magnetic shielding is below the surface of the base so that damage to the magnetic shielding in the storage position is reduced. The depth of the depression in the base is preferably uniform over the entire area of the depression and is preferably from about 0.02 cm to about 0.03 cm, more preferably about 0.0254 cm.

When the support is made of an electrically conducting material, the support may be grounded to act as a shield against electric fields generated by the computer. For example, electrical connectors (e.g. alligator clips) may be used to connect the support to a ground terminal, such as those on a wall plug receptacle. If the support is coated with a non-conducting material (e.g. anodized aluminum), it may be necessary to provide an electrically conducting contact point on the support.

In the working position, the support may be used by a sitting person with the flange to the rear. In this way, the support keeps the computer level while being used on the person's lap. When a person is in a reclining position, for example with feet up on a table, the orientation of the support may be reversed so that the flange is at the front. In this way, the computer is in a more horizontal position for the reclining person than it would be if the flange were at the rear thereby reducing the possibility that the computer will slide off the support. The support may also be used as a writing surface.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 7A is a plan view of the top tray of FIG. 6;
FIG. 7B is a rear end view of the top tray of FIG. 6;
FIG. 7C is a side view of the top tray of FIG. 6.

DESCRIPTION OF PREFERRED EMBODIMENTS

Referring to FIGS. 1–9, a support of the present invention generally depicted at 1 comprises a top tray 10 and a bottom tray 100. Top tray 10 and bottom tray 100 cooperate to form support 1 without the need for the trays to be attached. Support 1 has a working position depicted in FIGS. 1–2 and a storage position depicted in FIGS. 3–5.

Figure 6:
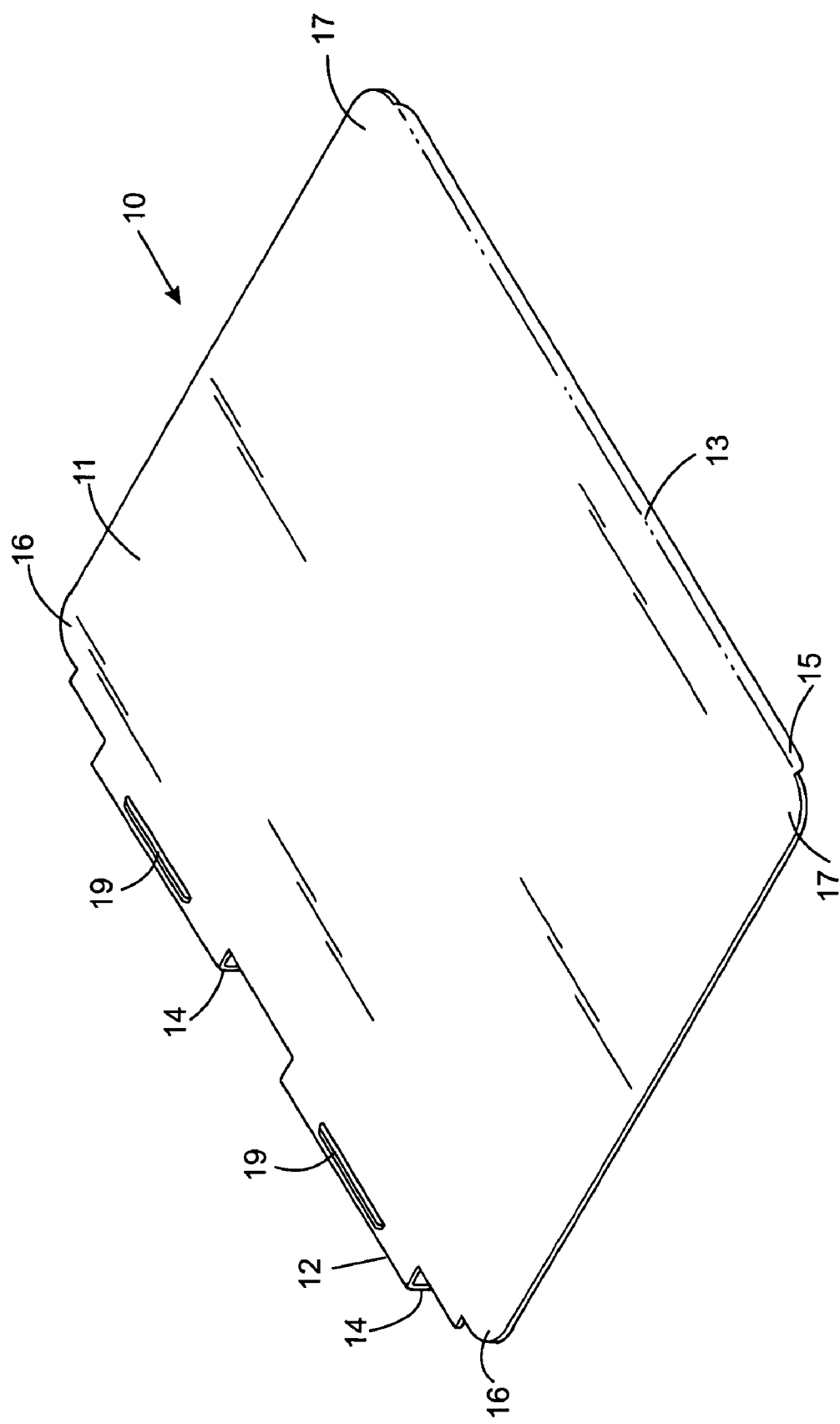
FIG. 6 is a perspective view of a top tray of the support of FIG. 1.

Referring specifically to FIGS. 6 and 7, top tray 10 is made of a single piece of anodized aluminum 1 mm thick and comprises a top base 11 that is 31.8 cm wide and 26.0 cm deep. Top base 11 has a rear end 12 and a front end 13. At rear end 12 there are two downwardly depending spaced-apart rear lips 14. At front end 13 is a downwardly depending front lip 15. Between and beside spaced-apart rear lips 14, the top base 11 is notched out at rear end 12. Ridges 19 proximal rear end 12 are about 3 mm thick and 5 mm high. Corners 16 of rear end 12 are cut-out and rounded. Corners 17 of front end 13 are also rounded. Lips 14,15 are each about 1 mm deep.

Figure 8:
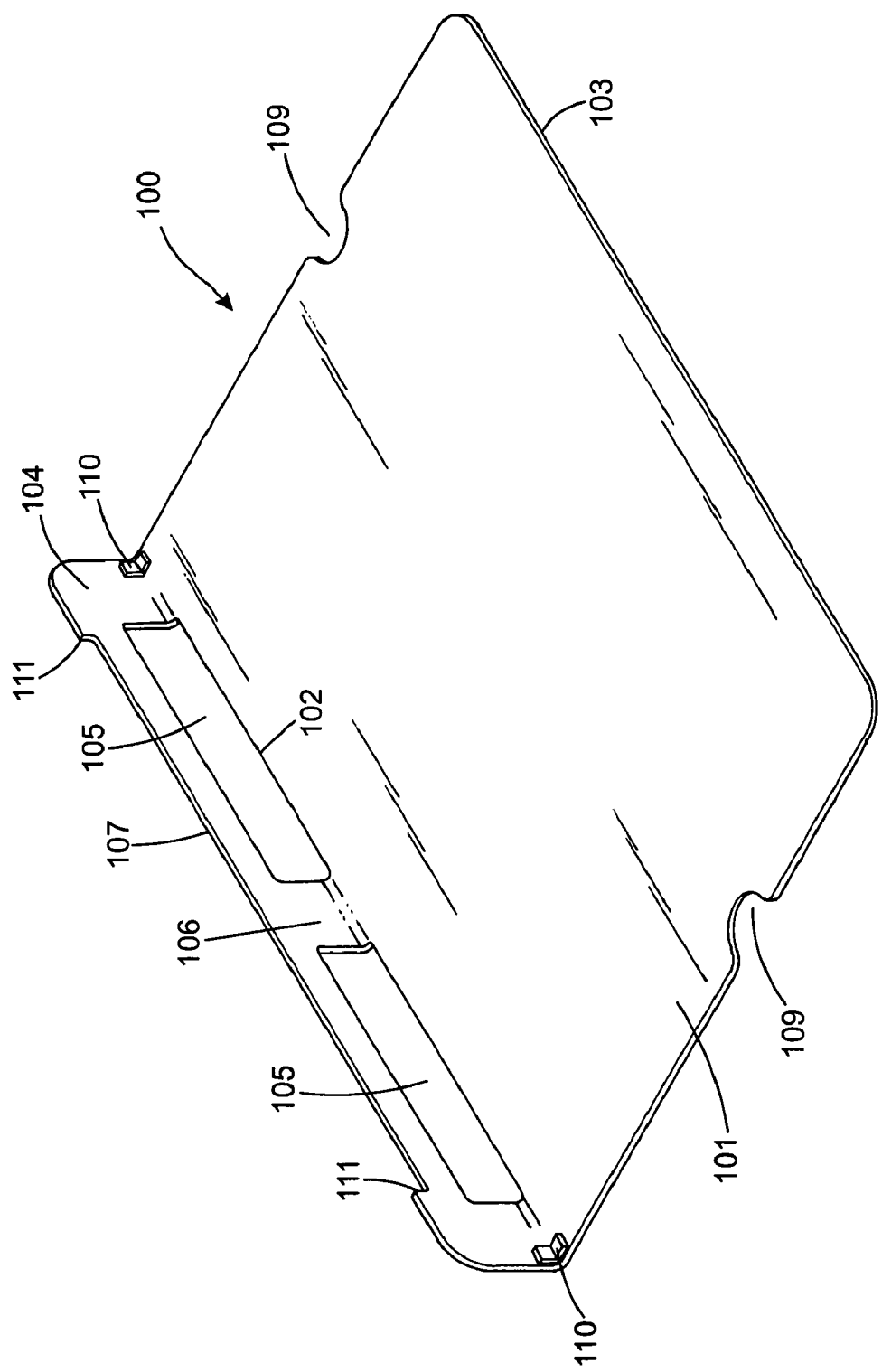
FIG. 8 is a perspective view of a bottom tray of the support of FIG. 1.
Figures 9A, 9B:
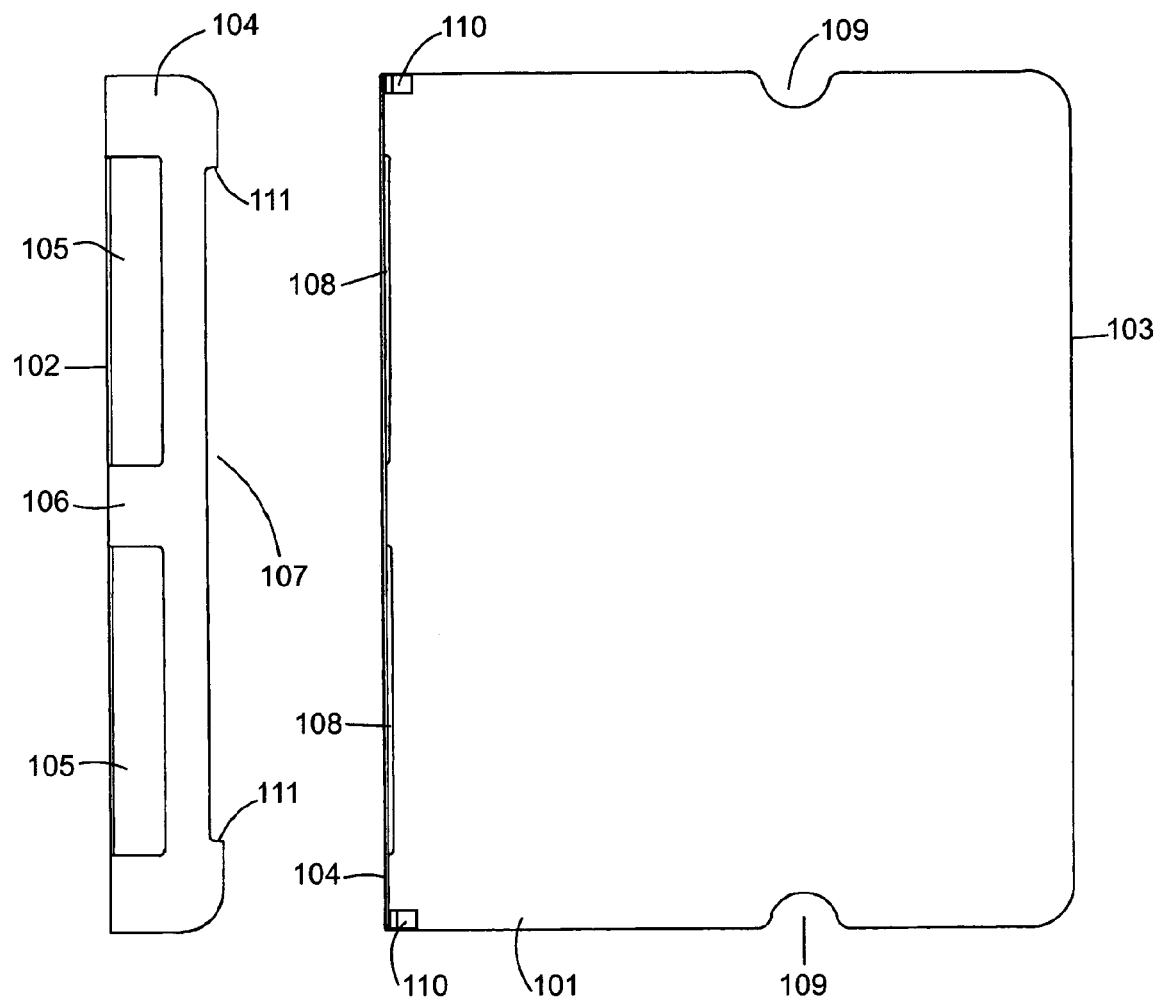
FIG. 9A is a plan view of the top tray of FIG. 8.
FIG. 9B is a rear end view of the top tray of FIG. 8.
Figure 9C:
FIG. 9C is a side view of the top tray of FIG. 8.

Referring specifically to FIGS. 8 and 9, bottom tray 100 is made of a single piece of anodized aluminum 1 mm thick and comprises a bottom base 101 that is 31.8 cm wide and 26.0 cm deep. Bottom base 101 has a rear end 102 and a front end 103. A flange 104 3.8 cm in height extends perpendicularly upwardly from rear end 102 of bottom base 101. Flange 104 comprises two slots 105 and a reinforcing region 106 between the slots. Flange 104 has a notch 107 in the top about 5 mm deep extending along most of the length of the flange. Bottom base 101 has notched out portions 108 at rear end 102. Bottom base 101 comprises semicircular finger gaps 109 on each side edge. Corners situated at rear end 102 of bottom base 101 and the bottom corners of flange 104 are 1 mm thick raised portions 110. Rear and front corners of bottom base 101 and corners of flange 104 are rounded.

Figure 1:
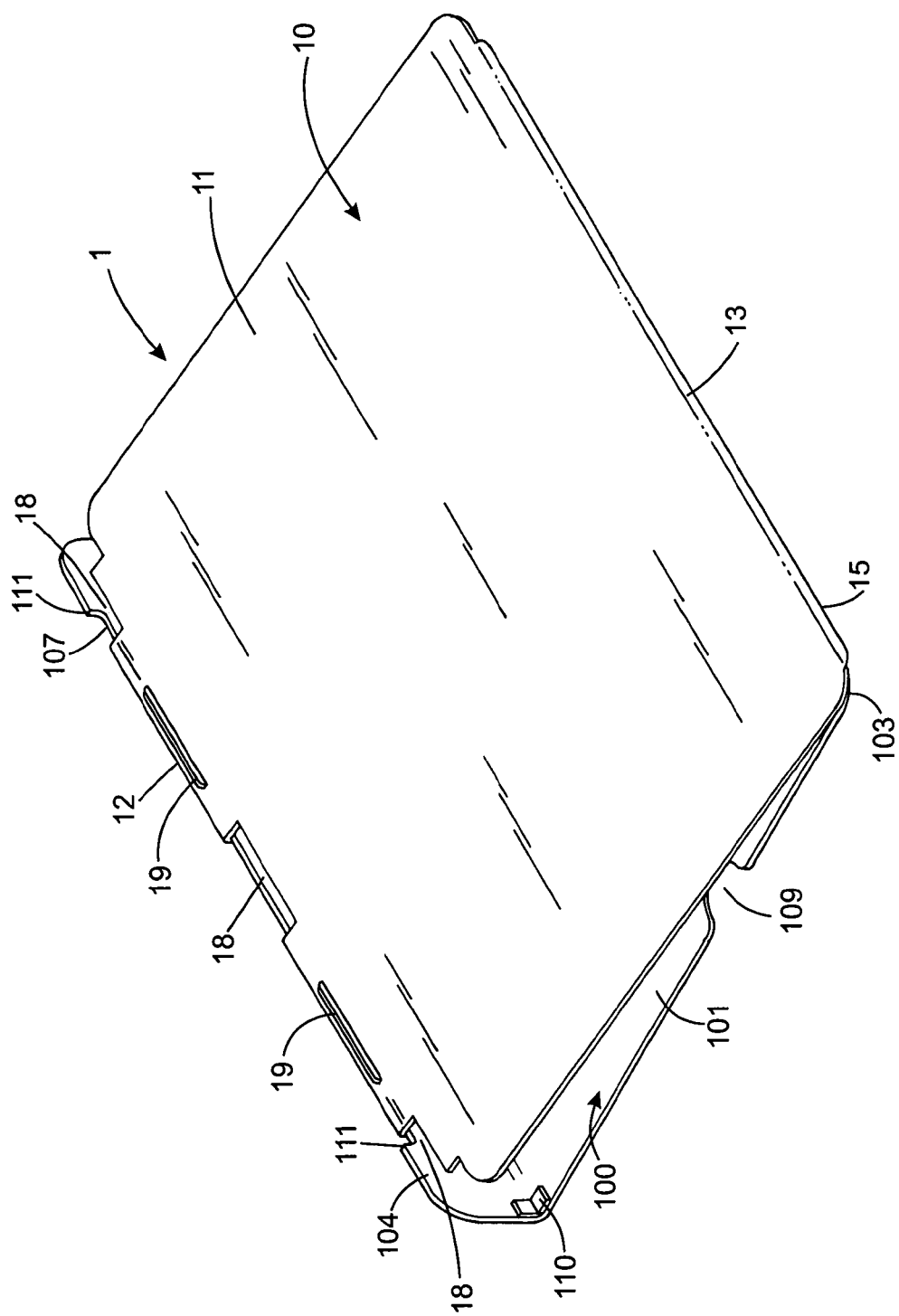
FIG. 1 is a perspective view of a support of the present invention in a working position.
Figures 2A, 2B:
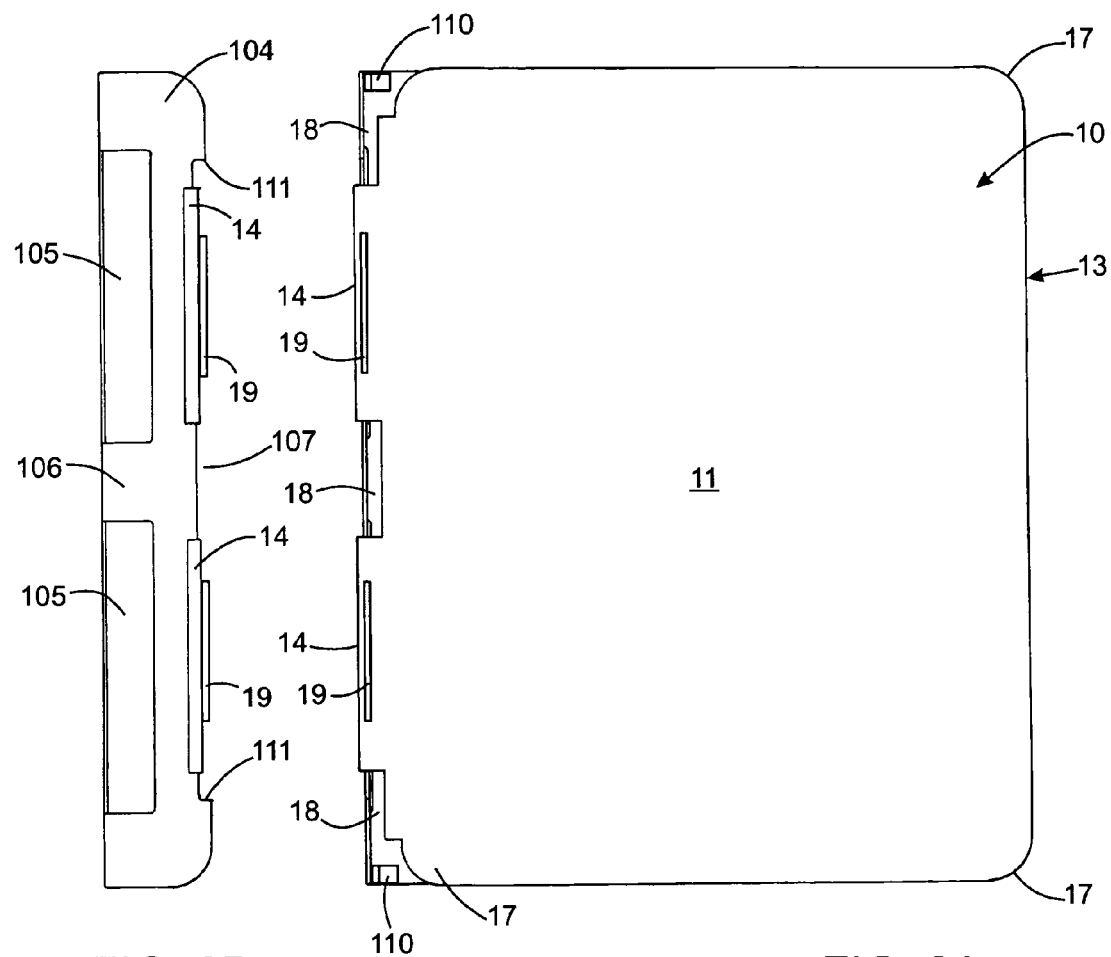
FIG. 2A is a plan view of the support of FIG. 1.
FIG. 2B is a rear end view of the support of FIG. 1.
Figure 2C:
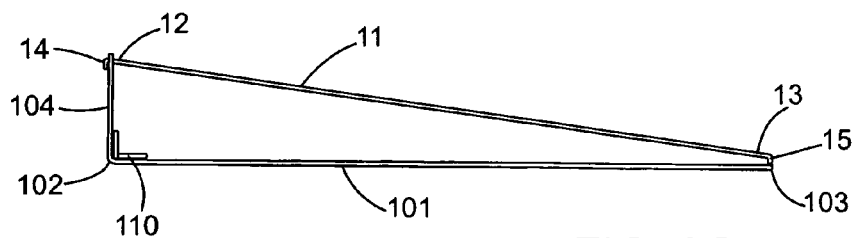
FIG. 2C is a side view of the support of FIG. 1.
Figure 10:
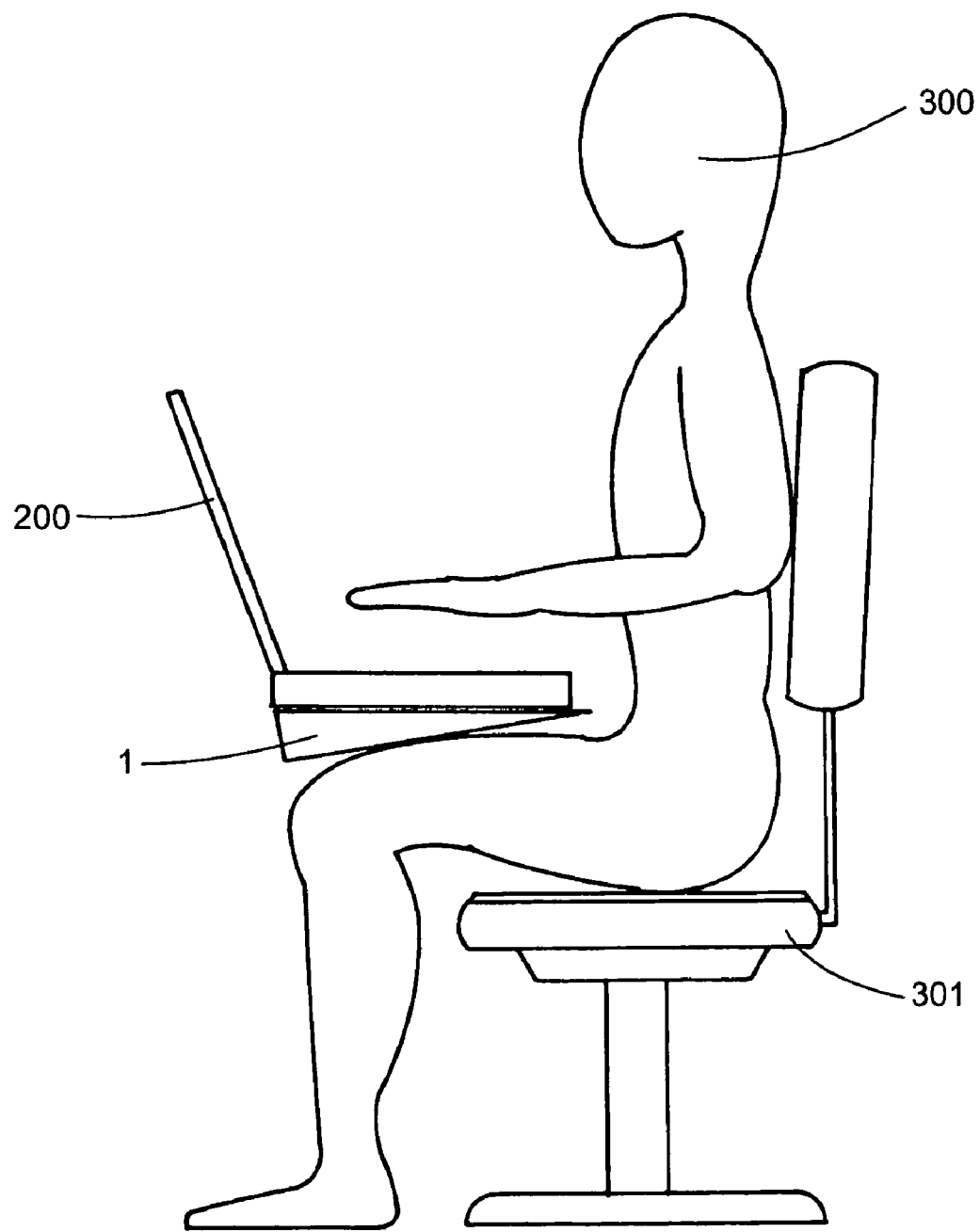
FIG. 10 is a schematic illustration of the support of FIG. 1 being used to support a laptop computer on a sitting person's lap; and,
FIG. 11 is a schematic illustration of the support of FIG. 1 being used to support a laptop computer on a reclining person's lap.

Referring to FIGS. 1–2, in the working position, top tray 10 rests on the top of flange 104 in notch 107. Rear lip 14 catches flange 104 to prevent the top tray from sliding towards front end 103 of bottom base 101. Ends 111 of notch 107 prevent the top tray from sliding off to the side of bottom tray 100 and also stick out slightly beyond the top surface of top tray 10. Gaps 18 between flange 104 and rear end 12 of top base 11 are created where top base 11 is notched out at rear end 12. Gaps 18 reduce contact between top tray 10 and bottom tray 100 to reduce heat conduction from the top tray to the bottom tray and to provide better air convection between the trays. Slots 105 reduce the weight of bottom tray 100 and provide better air convection between top tray 10 and bottom tray 100. Front lip 15 rests on bottom base 101 at front end 103 to raise front end 13 of top base 10 off bottom base 101. Top base 11 is on an incline with respect to bottom base 101. As depicted in FIG. 10, bottom base 101 rests on a sitting person's lap and a laptop computer 200 rests on top base 11. Due to the natural incline of a person's lap when seated, top base 11 is horizontal when support 1 is on a person's lap.

Figure 3:
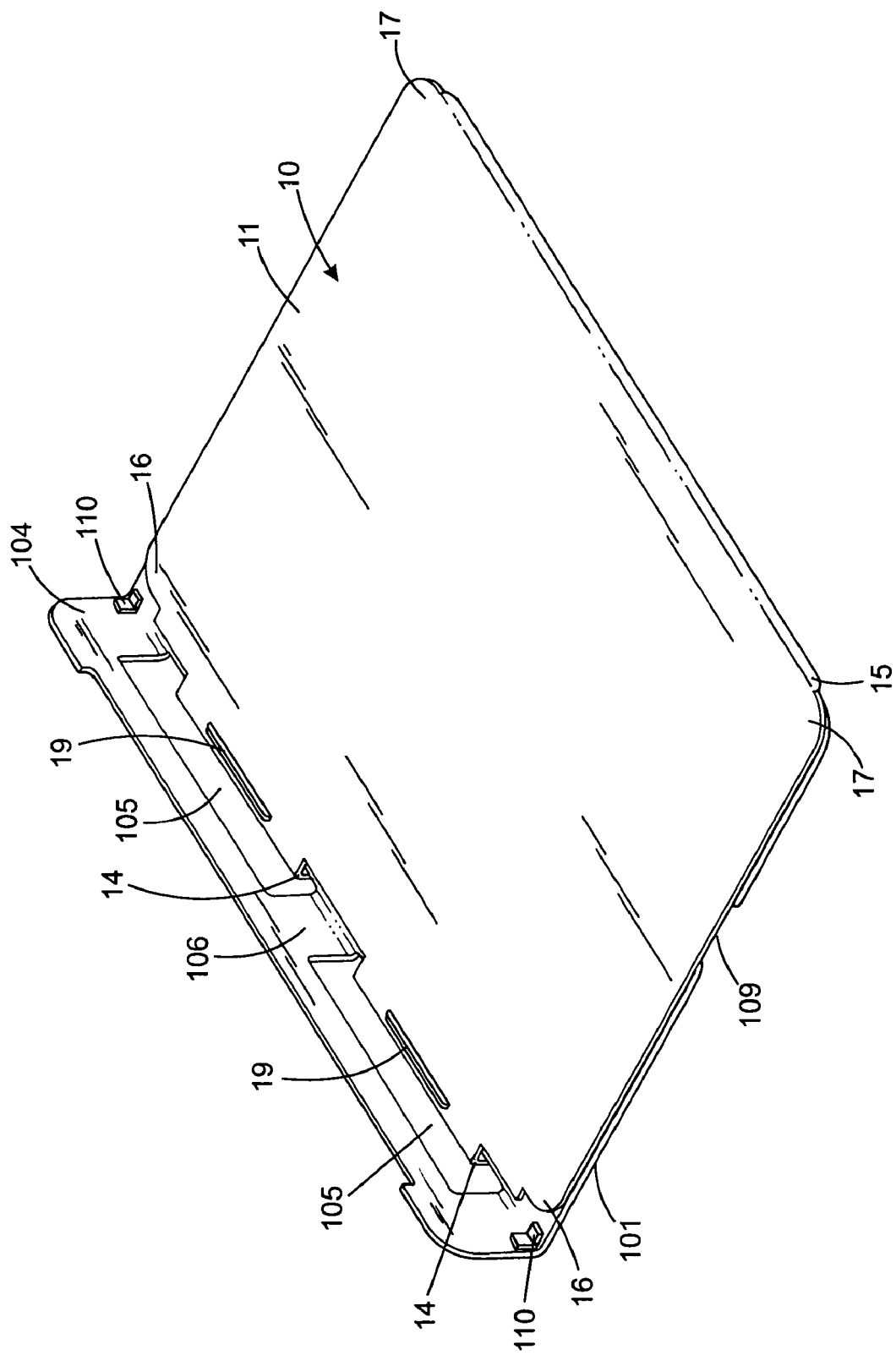
FIG. 3 is a perspective view of the support of FIG. 1 in a storage position.
Figures 4A, 4B:
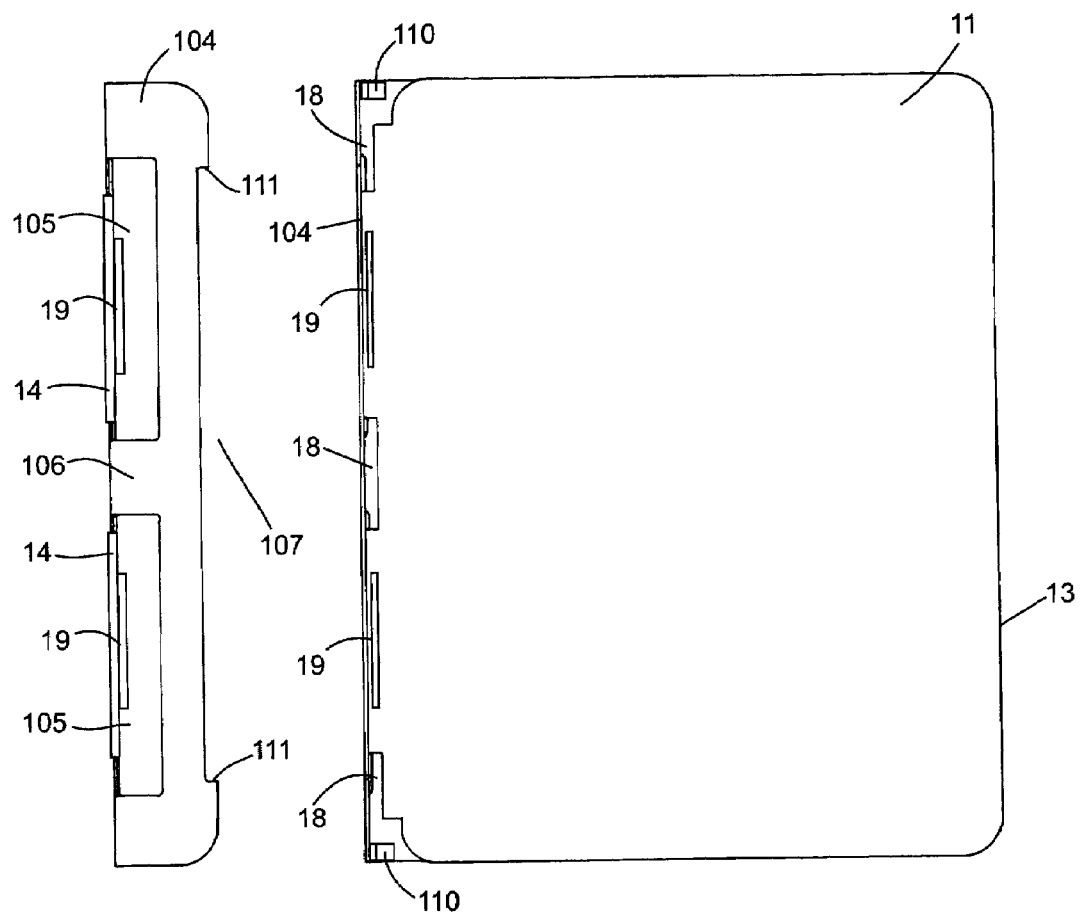
FIG. 4A is a plan view of the support of FIG. 3.
FIG. 4B is a rear end view of the support of FIG. 3.
Figure 4C:
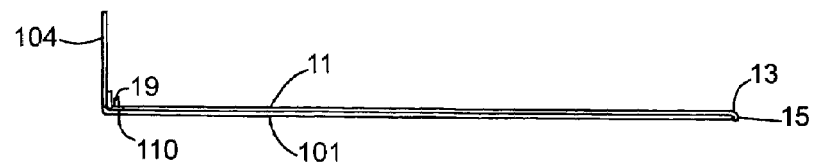
FIG. 4C is a side view of the support of FIG. 3.
Figure 5:
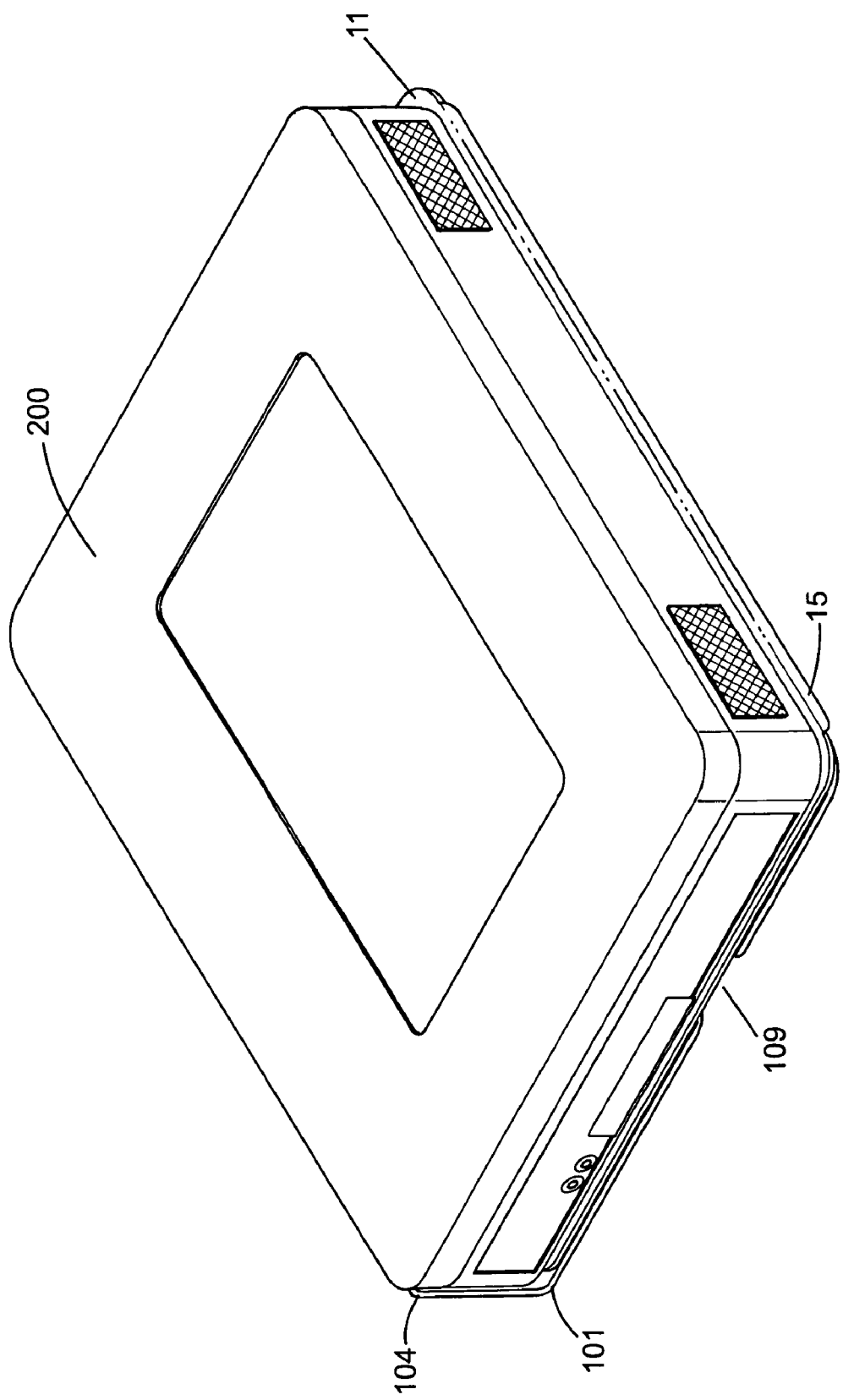
FIG. 5 is a perspective view of the support of FIG. 3 with a laptop computer resting thereon.

Referring to FIGS. 3–5, in the storage position, top tray 10 rests on bottom tray 100 such that top base 11 lies flat on bottom base 101. Rear lips 14 are through slots 105 straddling reinforcing region 106 and catch rear end 102 of bottom base 101 to limit sliding of top tray 10 toward front end 103 of the bottom base. Front lip 15 catches front end 103 of bottom base 101 to limit sliding of top tray 10 toward rear end 102 of the bottom base. Notched out portions 108 at rear end 102 of bottom base 101 permit rear lips 14 to sit flush with flange 104 and bottom base 101 in side view (FIG. 4C) and with the flange in plan view (FIG. 4A). Cut-outs at corners 16 of rear end 12 of top base 11 provide room for raised portions 110 which accommodate the rounding that occurs where flange 104 meets bottom base 101. Raised portions 110 provide a flat surface for computer 200 (FIG. 5) to rest on. Finger gaps 109 on bottom base 101 facilitate lifting top tray 10 together with computer 200 from the storage position to the working position. As best seen in FIG. 5, flange 104 is lower in height than the thickness of computer 200 and bases 11,101 are of a size to just fit under the computer. Thus, support 1 provides a slim profile in the storage position to facilitate inserting the computer together with the support into a laptop carrying case (not shown).

Support 1 is easily convertible from the storage position to the working position and vice versa. To convert from the storage position to the working position, a person grips computer 200 together with top base 11 at finger gaps 109 and then lifts the computer and the top base out of and away from bottom tray 100. Then the person places top tray 10 together with computer 200 on the top of flange 104 so that rear lips 14 sit in notch 107 catching the flange. The whole operation takes about one second to perform. To convert from the working position to the storage position, top base 11 is gripped together with computer 200, lifted off flange 104 and then top tray 10 is placed on bottom tray 100 such that top base 11 and bottom base 101 are flat in contact with each other and rear lips 14 are through slots 105 and catch rear end 102 of the bottom base. This whole operation also takes about one second to perform.

Figure 11:
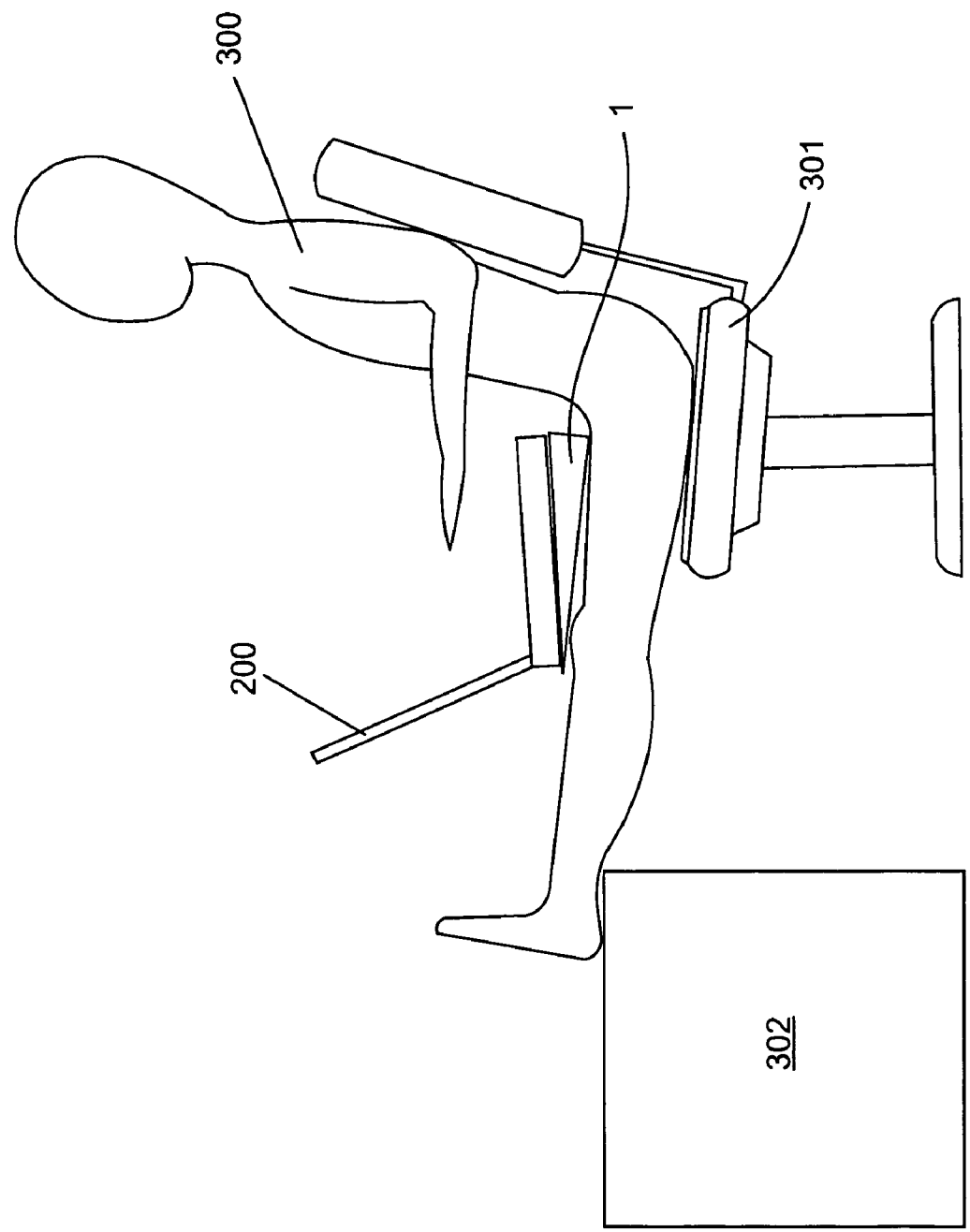

FIG. 10 shows person 300 sitting on chair 301 with computer 200 resting on support 1 on the person's lap. Flange 104 is towards the rear and computer 200 sits horizontally due to the natural incline of the person's lap. When person 300 is reclined with feet up on desk 302 as shown in FIG. 11, the person's legs incline the other way. To accommodate the reverse incline, support 1 may be reversed so that flange 104 is at the front. This helps keep computer 200 in a more horizontal position.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

REFERENCE NUMERALS

1 Support
10 Top tray
11 Top base
12 Rear end of top base
13 Front end of top base
14 Rear lips
15 Front lip
16 Corners of rear end of top base
17 Corners of front end of top base
18 Gaps at rear end of top base
19 Ridges
100 Bottom tray
101 Bottom base
102 Rear end of bottom base
103 Front end of bottom base
104 Flange
105 Slots
106 Reinforcing region
107 Notch on flange
108 Notched out portion of bottom base
109 Finger gaps
110 Raised portions
111 Ends of notch on flange
200 Laptop computer
300 Person
301 Chair
302 Desk

The invention claimed is:

1. A support for supporting a laptop computer comprising:
a top tray moveable from an inclined working position to a flat storage and, comprising a top base having a first end and a second end opposite the first end, and having a first lip proximal the end;
a bottom tray in cooperation with but not attached to a top tray, comprising a bottom base having a first end and a second end opposite the first end, and having a flange extending upwardly proximal the first end, the flange and/or the bottom base having an aperture for accepting the first lip of the top tray, the first lip of the top tray engaging the bottom base through the aperture when the top tray is in the storage position to limit sliding of the top tray toward the second end of the bottom base when the top tray is in the storage position; and means for preventing the top tray from sliding towards the second end of the bottom base when the top tray is in the working position.

2. The support of claim 1, wherein the means for preventing the top tray from sliding towards the second end of the bottom base comprises the first lip of the top tray engaging a top of the flange when the top tray is in the working position.

3. The support of claim 2, wherein the flange comprises a notch at the top of the flange within which the top base rests in the working position.

4. The support of claim 1, wherein the means for preventing the top tray from sliding towards the second end of the bottom base when the top tray is in the working position comprises a protuberance at a top of the flange inserted through a slit in the top base proximal the first end.

5. The support of claim 1, wherein the first lip comprises two spaced-apart lips and the aperture comprises two apertures separated by a reinforcing region of the flange.

6. The support of claim 1, wherein the bottom base comprises a notch or channel proximal the first end of the bottom base within which the first lip is engaged in the storage position.

7. The support of claim 1, wherein the top tray comprises a second lip proximal the second end which raises the top base off the bottom base in the working position and which engages the second end of the bottom base in the storage position to limit sliding of the top tray toward the first end of the bottom base.

8. The support of claim 1, wherein the bottom tray comprises a finger gap on a side edge of the bottom base to facilitate lifting the top tray off the bottom tray in the storage position.

9. The support of claim 1, wherein the top base comprises notches between and/or beside the first lip.

10. The support of claim 1 wherein the bottom tray comprises raised portions proximal corners of the first end where the flange meets the bottom base, and the top base comprises cut-outs to accommodate the raised portions.

11. The support of claim 1, wherein the top and/or bottom tray comprise magnetic shielding.

12. A support for supporting a laptop computer comprising:
a top tray moveable from an inclined working position to a flat storage position and, comprising a top base having a rear end and a front end opposite the rear end, a downwardly depending rear lip at the rear end, and a downwardly depending front lip at the front end; and,
a bottom tray cooperation with but not attached to a top tray, comprising a bottom base having a rear end and a front end opposite the rear end, and having an upwardly extending flange at the rear end, the flange having an aperture for accepting the rear lip of the top tray in the storage position, the flange having a notch at a top of the flange within which the top base rests in the working position, the rear lip of the top tray engaging a top of the flange when the top tray is in the working position to prevent the top tray from sliding towards the second end of the bottom base when the top tray is in the working position, and the rear lip of the top tray engaging the bottom base through the aperture when the top tray is in the storage position to limit sliding of the top tray toward the second end of the bottom base when the top tray is in the storage position.

13. The support of claim 12, wherein the rear lip comprises two spaced-apart lips, the aperture comprises two slots separated by a reinforcing region of the flange, and the two-spaced apart lips straddle the reinforcing region in the storage position.

14. The support of claim 13, wherein the front lip rests on the bottom base in the working position, and engages the front end of the bottom base to limit sliding of the top tray toward the rear end of the bottom base in the storage position.

15. The support of claim 14, wherein the bottom base comprises two notches at the rear end within which the spaced-apart lips engage the bottom base in the storage position.

16. The support of claim 15, wherein the top base comprises notches at the rear end beside and between the spaced-apart lips.

17. The support of claim 16, wherein the bottom tray comprises raised portions at corners of the rear end where the flange meets the bottom base, and the top base comprises cut-outs at corners of the rear end of the top base to accommodate the raised portions.

18. The support of claim 17, wherein the bottom tray comprises finger gaps on side edges of the bottom base to facilitate lifting the top tray off of the bottom tray in the storage position.

19. The support of claim 18, wherein the bottom base has magnetic shielding inset into an upside thereof, and the top base has magnetic shielding inset into an underside thereof.

20. The support of claim 19, wherein the trays comprise a metal having a thermal conductivity greater than 1.0 watt $cm^{-1}$ $K^{-1}$ at 273 K.

21. The support of claim 19, wherein the trays comprise a metal having a thermal conductivity greater than 1.3 watt $cm^{-1}$ $K^{-1}$ at 273 K.

22. The support of claim 19, wherein the trays comprise anodized aluminum or magnesium alloy.

23. The support of claim 19, wherein the trays comprise an electrically conducting metal.

* * * * *